(12) United States Patent
Ikeda et al.

(10) Patent No.: US 8,570,298 B2
(45) Date of Patent: Oct. 29, 2013

(54) DISPLAY/INPUT DEVICE

(75) Inventors: Tetsuo Ikeda, Tokyo (JP); Ryu Aoyama, Kanagawa (JP); Takehiko Tsurumi, Tokyo (JP); Fuminori Homma, Tokyo (JP); Shoichiro Moriya, Tokyo (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 12/645,714

(22) Filed: Dec. 23, 2009

(65) Prior Publication Data

US 2010/0188363 A1 Jul. 29, 2010

(30) Foreign Application Priority Data

Jan. 28, 2009 (JP) ................................ P2009-017191

(51) Int. Cl.
*G06F 3/045* (2006.01)
(52) U.S. Cl.
USPC ........................................................ 345/174
(58) Field of Classification Search
USPC ........................................................ 345/173
See application file for complete search history.

(56) References Cited

U.S. PATENT DOCUMENTS

| | | | | |
|---|---|---|---|---|
| 5,548,306 | A | * | 8/1996 | Yates et al. ..................... 345/174 |
| 6,088,024 | A | * | 7/2000 | Yamagata ..................... 345/173 |
| 2004/0164971 | A1 | * | 8/2004 | Hayward et al. .............. 345/179 |
| 2005/0200611 | A1 | * | 9/2005 | Goto et al. ..................... 345/173 |
| 2006/0238517 | A1 | * | 10/2006 | King et al. ..................... 345/173 |
| 2009/0091545 | A1 | * | 4/2009 | Wang et al. ..................... 345/173 |
| 2009/0219255 | A1 | * | 9/2009 | Woolley et al. ............... 345/173 |

FOREIGN PATENT DOCUMENTS

JP 4161814 8/2008

* cited by examiner

*Primary Examiner* — Joseph Feild
*Assistant Examiner* — Nicholas Lee
(74) *Attorney, Agent, or Firm* — Sherr & Jiang, PLLC

(57) ABSTRACT

A display/input device is provided which includes a position sensor on which an electrode pattern in grid form is arranged, the position sensor being for specifying a position of an operating tool by detecting a capacitance changing at a contact part or a proximity part at a time the operating tool is made to contact the electrode pattern or is brought into proximity of the electrode pattern, and an outer frame portion forming an outer frame of a display screen provided with the position sensor. A boundary of an area where the position of the operating tool can be specified by the position sensor despite a non-presence of the electrode pattern is visually or haptically indicated at the outer frame portion.

14 Claims, 9 Drawing Sheets

CONFIGURATION EXAMPLE FOR MAKING ACTUAL SENSOR AREA HAPTICALLY DISCRIMINABLE

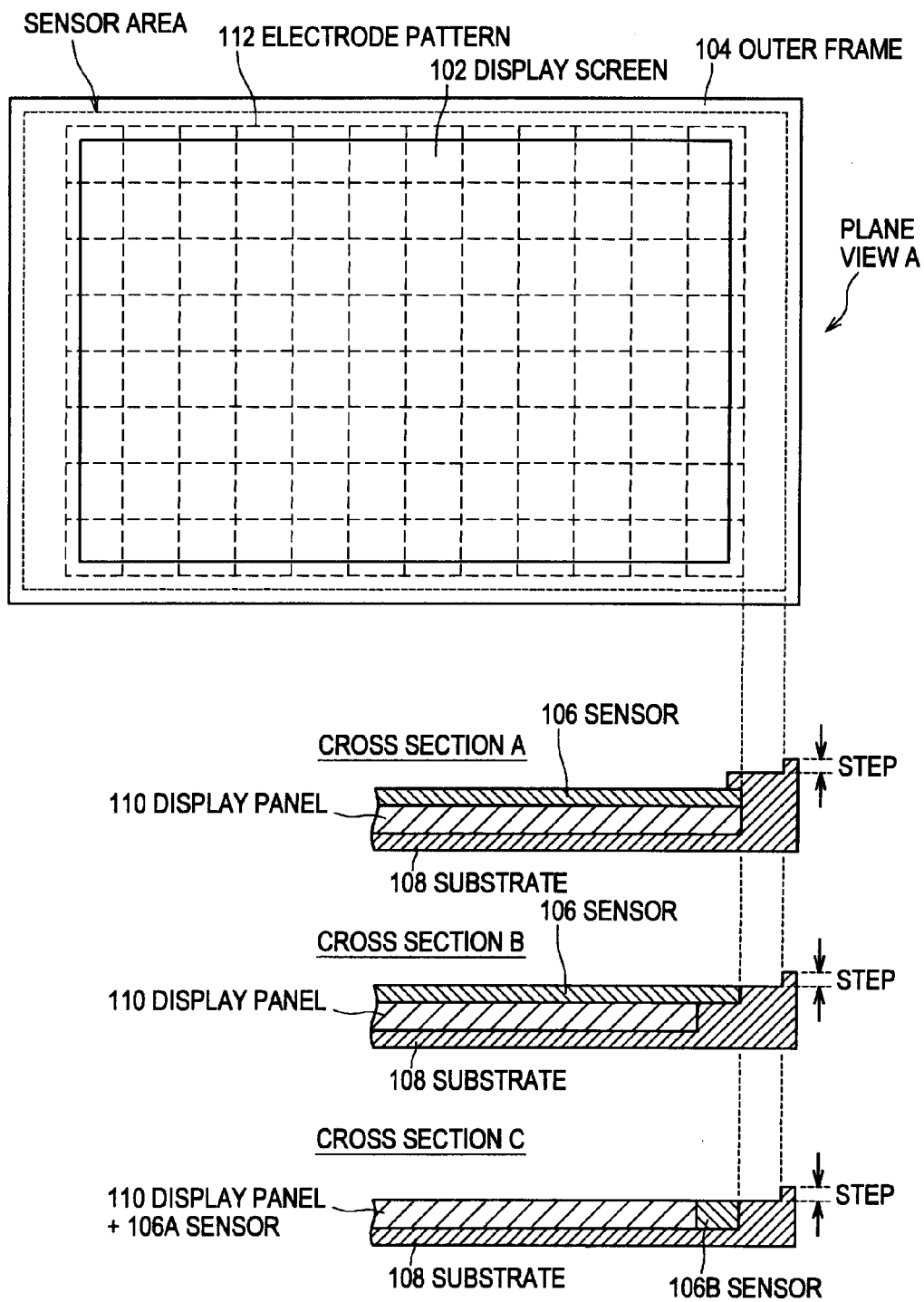

DISPLAY/INPUT DEVICE

BACKGROUND OF THE INVENTION

1. Field of the Invention

The present invention relates to a display/input device.

2. Description of the Related Art

In recent years, a small electronic device is often provided with a touch panel as an input device for inputting information or for operating a graphical user interface (hereinafter, a GUI). By using a touch panel, it becomes unnecessary to separately provide an input section such as a keyboard, and thus an electronic device can be miniaturized. Furthermore, a touch panel is also a display device on which an image, a GUI or the like is displayed. Thus, by using a touch panel, an intuitive operating system for directly touching and operating an image, a GUI or the like displayed on the touch panel can be realized. Having these features, a touch panel is mounted on various electronic devices, such as a mobile information terminal, a mobile phone, a car navigation system, a lap-top personal computer, or an information appliance.

As described above, a touch panel has a function of an input device and a function of a display device. The function of a display device is realized by using a display panel, such as a liquid crystal display panel (hereinafter, an LCD panel) or an organic electroluminescent display panel (hereinafter, an OELD panel), for example. On the other hand, the function of an input device is realized by providing on a display panel a capacitive sensor or an optical sensor for optically scanning an operating tool that is brought into proximity of or made to contact the surface of the display panel. In many cases, a sensor area where sensing by the capacitive sensor or the optical sensor is possible is set in a pixel area (displayable area) on the display panel. Furthermore, Japanese Patent No. 4161814 discloses a technology for expanding the sensor area to the frame portion of a display panel and realizing a convenient operating system by using the expanded sensor area.

SUMMARY OF THE INVENTION

However, in case the sensor area is expanded to the frame portion of the display panel, a user will have difficulty grasping the boundary of the expanded sensor area. Furthermore, in case of a touch panel formed by a capacitive sensor having a grid electrode pattern, the electrode pattern has to be arranged so as to include the expanded portion of the sensor area. The size of each mesh forming the electrode pattern corresponds to the resolution of the capacitive sensor. Accordingly, when using an electrode pattern of the same resolution, if the sensor area is expanded to the frame portion of the display panel, the resolution of the capacitive sensor is reduced. Thus, a technology for expanding the sensor area to the frame portion of a display panel without reducing the resolution of the capacitive sensor as best as possible is desired.

Thus, in light of the foregoing, it is desirable to provide a novel and improved display/input device according to which a sensor area is expanded to the frame portion of a display panel without greatly reducing the resolution of a capacitive sensor and the boundary of the expanded sensor area is easily grasped by a user.

According to an embodiment of the present invention, there is provided a display/input device including a position sensor on which an electrode pattern in grid form is arranged, the position sensor being for specifying a position of an operating tool by detecting a capacitance changing at a contact part or a proximity part at a time the operating tool is made to contact the electrode pattern or is brought into proximity of the electrode pattern, and an outer frame portion forming an outer frame of a display screen provided with the position sensor. A boundary of an area where the position of the operating tool can be specified by the position sensor despite a non-presence of the electrode pattern is visually or haptically indicated at the outer frame portion.

Furthermore, among areas included in the outer frame portion, the area where the position of the operating tool can be specified by the position sensor and an area where the position of the operating tool cannot be specified by the position sensor may be formed from materials with respectively different feels.

Furthermore, a step may be provided at a boundary portion between the area where the position of the operating tool can be specified by the position sensor and an area where the position of the operating tool cannot be specified by the position sensor, among areas included in the outer frame portion.

Furthermore, a boundary line may be displayed at a boundary portion between the area where the position of the operating tool can be specified by the position sensor and an area where the position of the operating tool cannot be specified by the position sensor, among areas included in the outer frame portion.

Furthermore, among areas included in the outer frame portion, the area where the position of the operating tool can be specified by the position sensor and an area where the position of the operating tool cannot be specified by the position sensor may be configured to have respectively different colours.

According to the embodiments of the present invention described above, there is provided a novel and improved display/input device according to which a sensor area is expanded to the frame portion of a display panel without greatly reducing the resolution of a capacitive sensor and the boundary of the expanded sensor area is easily grasped by a user.

BRIEF DESCRIPTION OF THE DRAWINGS

FIG. 9 is an explanatory diagram showing an example of a method of the display/input device according to the present embodiment for haptically indicating a boundary of a sensor area capable of detecting a user input.

DETAILED DESCRIPTION OF THE EMBODIMENT(S)

Figure 1:
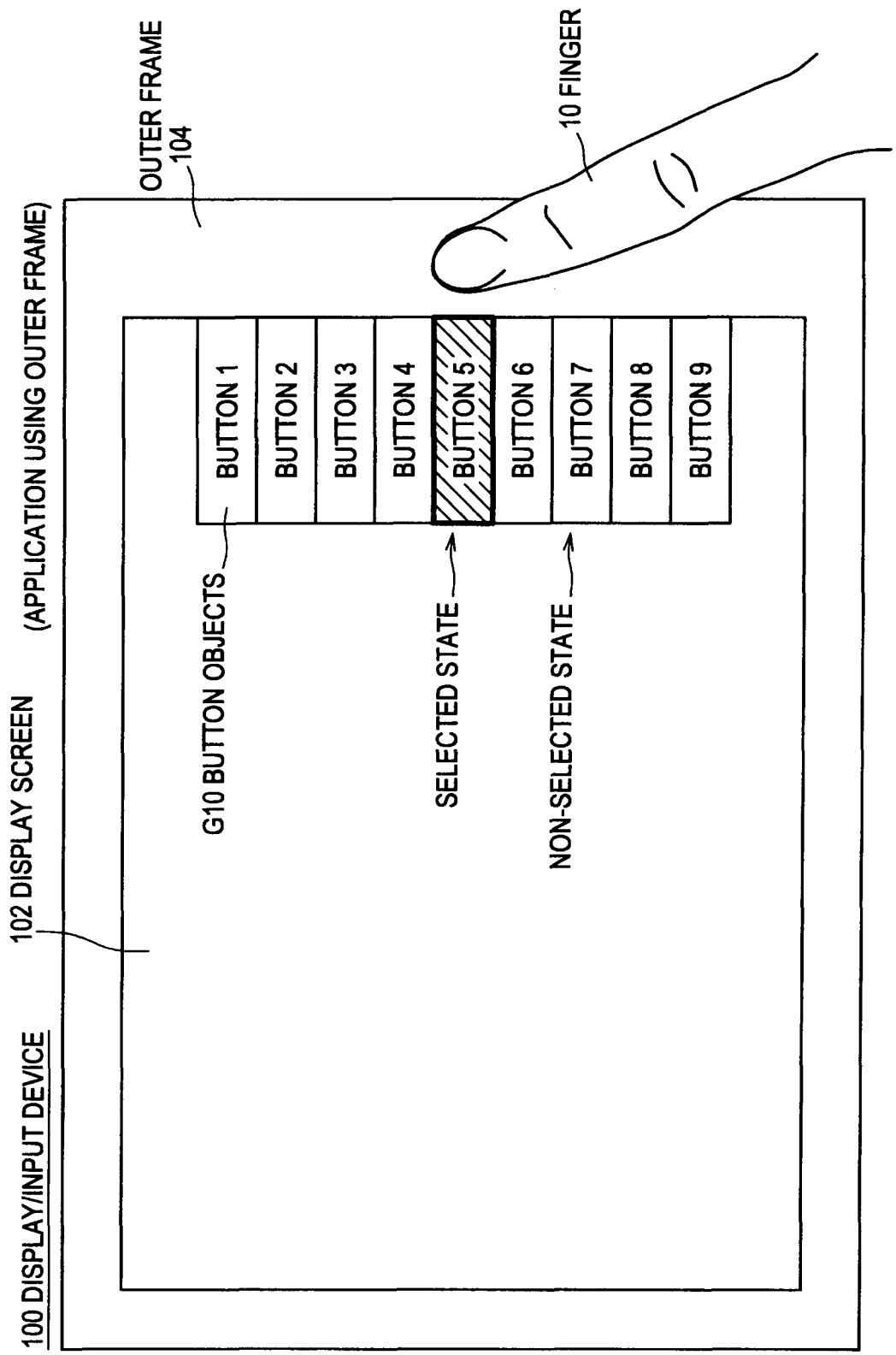
FIG. 1 is an explanatory diagram showing an example of an operating system (application) realized by a display/input device having a sensor area expanded to a frame portion of a display panel.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Explanation>

Here, a flow of explanation of an embodiment of the present invention to be described below will be briefly stated. First, with reference to FIG. 1, an explanation will be given on an operating system (application) realized by a display/input device having a sensor area expanded to the frame portion of a display panel. Then, referring to FIG. 2, the size of a sensor provided to the display/input device in case of expanding the sensor area to the frame portion of the display panel will be considered.

Next, a positional relationship between the display panel and the sensor provided to the display/input device in case of expanding the sensor area to the frame portion of the display panel, and configuration examples therefor will be described with reference to FIG. 3. Then, referring to FIG. 4, an electrode pattern of the sensor provided to the display/input device in case of expanding the sensor area to the frame portion of the display panel will be considered.

Next, referring to FIG. 5, a detection resolution of the sensor provided to the display/input device in case of expanding the sensor area to the frame portion of the display panel and a detection resolution of a sensor provided to the display/input device in case of non-expansion will be compared, and relationship therebetween will be described. Then, referring to FIG. 6, the electrode pattern of a sensor provided to a display/input device according to an embodiment of the present invention will be described.

Next, referring to FIG. 7, an example of a method of the display/input device according to an embodiment of the present invention for visually indicating a boundary of a sensor area capable of detecting a user input will be described. Then, referring to FIGS. 8 and 9, an example of a method of the display/input device according to an embodiment of the present invention for haptically indicating a boundary of a sensor area capable of detecting a user input will be described. Lastly, a technical idea of the present embodiment and effects obtained from the technical idea will be briefly described.

(Explanation Items)

1: Embodiment
1-1: Capacitive Touch Panel
1-2: Method for Expanding Sensor Area
1-3: Method for Clearly Indicating Sensor Area
1-3-1: Method for Clearly Indicating Boundary of Sensor Area by Silkscreen
1-3-2: Method for Clearly Indicating Boundary of Sensor Area by Changing Material
1-3-3: Method for Clearly Indicating Boundary of Sensor Area by Providing Step
2: Conclusion

1. Embodiment

An embodiment of the present invention will be described. The present embodiment proposes a technology for reducing a degradation of a resolution of a capacitive sensor occurring at the time of expanding a sensor area to an outer frame of a display screen. Furthermore, in addition to the technology, the present embodiment proposes a technology enabling a user to perceive clearly a boundary of the sensor area.

(1-1: Capacitive Touch Panel)

First, a configuration of a capacitive touch panel and its operating principle will be briefly described. The capacitive touch panel is mainly configured from a display panel on which an image or a GUI is displayed and a capacitive sensor provided on the display panel. The capacitive sensor is for detecting, when a user makes contact with or gets into proximity (hereinafter, touch) of the touch panel, a position touched by the user. To realize the detection function as described, electrodes having a grid pattern (hereinafter, an electrode pattern) are arranged in the capacitive sensor.

The electrode pattern is formed from a plurality of column electrodes extending in a longitudinal direction (hereinafter, an X-direction) of the display panel and a plurality of row electrodes extending in a Y-direction orthogonal to the X-direction, for example. Furthermore, the column electrodes and the row electrodes are arranged at positions spatially separated from each other with a dielectric material in between. Thus, a capacitor is equivalently formed by the column electrodes and the row electrodes. Also, each column electrode is connected to the ground, and each row electrode is connected to a detector for detecting the capacitance. When the capacitance changes between the column electrode and the row electrode, the position at which the capacitance has changed is specified by the detector.

Change in capacitance is caused by a finger of a user or the like brought into proximity of or made to contact the capacitive sensor. For example, when a finger of a user nears the capacitive sensor, a part of the electric field generated at the row electrodes and the column electrodes changes under the influence of the finger which is a type of a conductor, and the capacitance of the capacitor equivalently formed by the row electrodes and the column electrodes decreases. Moreover, the change in capacitance can be induced by using a part of a living body other than the finger, a touch pen formed from a conductor, or the like. Heretofore, a configuration of a capacitive touch panel as an example of the touch panel and its operating principle have been briefly described. In the following, explanation will be given with the use of such capacitive touch panel in mind.

(1-2: Method for Expanding Sensor Area)

Here, a method for expanding the sensor area will be described. Specifically, an example of an application which can be realized when the sensor area of a display/input device 100 according to the present embodiment is expanded and an electrode structure or the like of a sensor 106 of the display/input device 100 will be described. Moreover, the touch panel is an example of the display/input device 100. Also, the sensor 106 is an example of a position sensor.

(Application Using Outer Frame)

First, an application which can be realized with the display/input device 100 according to the present embodiment will be described with reference to FIG. 1. FIG. 1 is an explanatory diagram showing an example of an application which can be realized with the display/input device 100 according to the present embodiment.

As shown in FIG. 1, the display/input device 100 includes a display screen 102 and an outer frame 104. An image, a GUI or the like is displayed on the display screen 102. On the other hand, pixels are not arranged on the outer frame 104 and no image or GUI is displayed. Furthermore, the sensor area of the display/input device 100 is expanded to the outer frame 104 of the display screen 102. Therefore, when the outer frame 104 is operated by a finger 10, a button object G10 displayed on the display screen 102 is selected according to the operation, for example. Moreover, the button object G10 is an example of the GUI. Also, the outer frame 104 is an example of an outer frame portion.

Normally, the operation of the GUI displayed on the display screen 102 is performed by tapping or dragging the surface of the display screen 102 by the finger 10. For example, when button objects G10 for selecting functions are displayed, a user taps on a button object G10 associated with a desired function by the finger 10. At this time, the display/input device 100 detects the tapped position, and checks the detected position and the display position of the button object G10. Furthermore, the display/input device 100 specifies the taped button object G10 based on the check result. Information on the specified button object G10 is conveyed to an information processing apparatus (not shown) connected to the display/input device 100, for example.

With this configuration, an operation for selecting a function using a GM is realized. As described above, a user can directly operate the GUI displayed on the display screen 102 by the finger 10. Accordingly, an intuitive operating system is realized, and the operability is greatly improved. Such effect of improvement of the operability can be obtained by the GUI changing according to the movement of the finger 10 or by the function associated with the GUI being executed.

For example, let us assume that, in case of tracing up and down through a plurality of button objects G10 that are longitudinally arranged with the finger 10, a button object G10 in selected state changes according to the position of the finger 10. In this case, a user wanting to select a function has only to stop the movement of the finger 10 at a button object G10 associated with a desired function. Performing operation by directly touching the display screen 102 with the finger 10 is more intuitive and the operation is easier than selecting a button object G10 associated with a desired function by indirectly moving a cursor displayed on the display screen 102 by using a mouse or the like.

As shown in FIG. 1, in case all the button objects G10 are displayed on the display screen 102, the above-described operating system is intuitive and highly convenient. However, where there are a large number of button objects G10 that will not fit into the display screen 102, the user has to search for a button object G10 associated with a desired function by scrolling the screen. In such a case, the user would want to scroll the display of the button objects G10 at a high speed. However, the scroll operation by the finger 10 is associated with a scroll operation of the button objects G10 at a normal speed.

Accordingly, to switch to a high-speed scroll mode, the user has to select a specific button or input other particular gesture. Thus, to reduce such operation burden, a method of using the outer frame 104 is proposed. For example, by associating a high-speed scroll function for the button objects G10 with the movement of tracing up and down the outer frame 104, the operation burden of the user can be reduced. Also, the operation becomes intuitive compared to the operation of a specific button or the input of a gesture, and the operability is improved. Particularly, the only difference between a scroll operation at a normal speed and a high-speed scroll operation is scroll positions to be traced, and there is a commonality between the movements of the finger 10, and thus, the user can switch between the operations naturally.

An explanation has been given with the scroll operation for the button objects G10 as an example. However, besides this example, a method for associating with a user input to be performed at the outer frame 104 an operation related to an operation to be performed by directly touching an object displayed on the display screen 102 is remarkably effective. A technology for expanding the sensor area to the outer frame 104 is desired to improve the operability by expanding the operating system. In the following, refinements to the display/input device 100 to expand the sensor area to the outer frame 104 will be described.

(Method 1 for Expanding Sensor Area)

Figure 2:
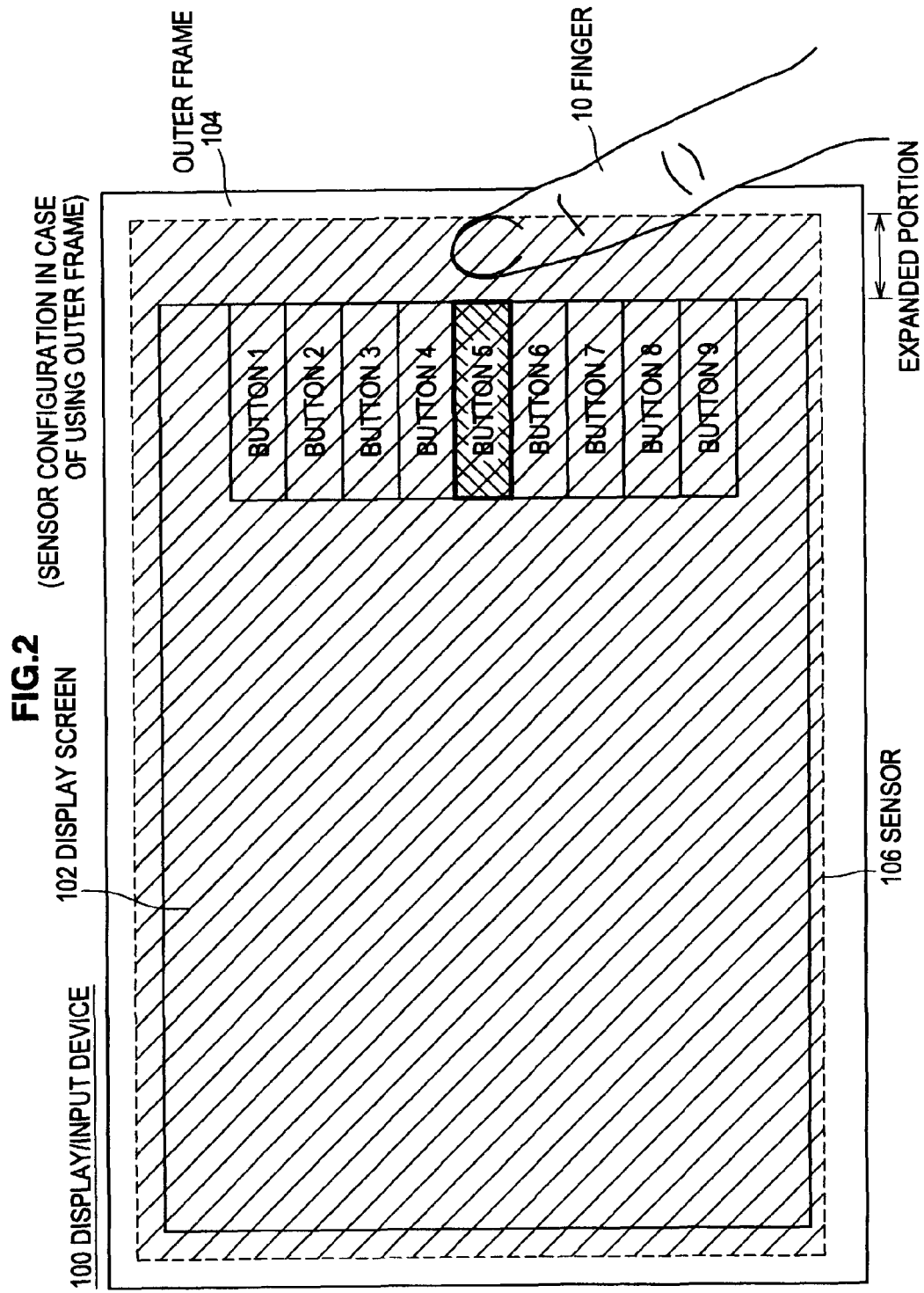
FIG. 2 is an explanatory diagram showing a size of a sensor provided to the display/input device in case of expanding the sensor area to the frame portion of the display panel.

As shown in FIG. 2, the display/input device 100 is provided with the sensor 106 for detecting a position touched by the finger 10. To expand the sensor area to the outer frame 104 to realize the operating system as described above, this sensor 106 should be extended to the outer frame 104. When the sensor 106 is extended to the outer frame 104, the sensor area is expanded to the portion (hereinafter, an expanded portion) of the sensor 106, the portion being extending out to the outer frame 104, and the movement of the finger 10 tracing the outer frame 104 can be detected by the sensor 106.

Figure 3:
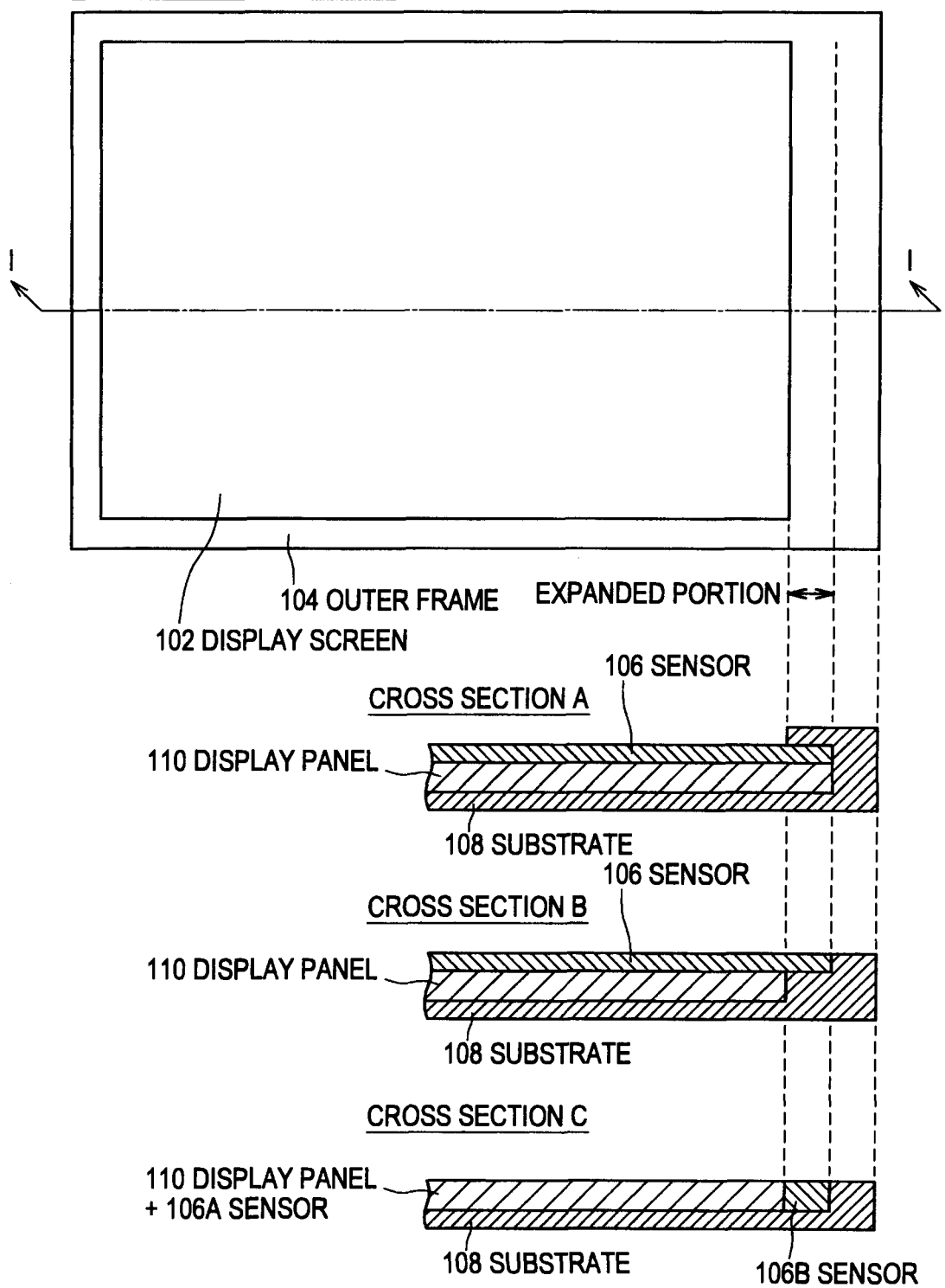
FIG. 3 is an explanatory diagram showing a positional relationship between the display panel and the sensor provided to the display/input device in case of expanding the sensor area to the frame portion of the display panel, and configuration examples therefor.

As a method for extending the sensor 106 to the outer frame 104, there is a method as shown in FIG. 3, for example. FIG. 3 is an explanatory diagram showing cross-sectional structures of the display/input device 100 at the expanded portion. FIG. 3 shows 3 types of cross-sectional structures (cross section A, cross section B, and cross section C). These cross-sectional diagrams are obtained by cutting the display/input device 100 along the I-I line. Incidentally, the display/input device 100 includes the sensor 106, a substrate 108, and a display panel 110. The display panel 110 is an LCD panel, an OELD panel, or the like, for example.

(Cross Section A)

The structure of the cross section A has its feature in the sizes of the sensor 106 and display panel 110. When the sensor area is confined to the inside of the display screen 102, the display panel 110 and the sensor 106 are in many cases not provided to the area of the outer frame 104. However, in case of the cross-section A, a multilayer structure is formed, similarly to the display screen 102, in the order of the substrate 108, the display panel 110, the sensor 106 and the substrate 108 from the bottom layer. That is, in case of the cross section A, the layers of the sensor 106 and display panel 110 provided to the area of the display screen 102 are simply extended to the outer frame 104. Also, the area of the outer frame 104 not used for displaying an image, a GUI or the like is covered by a part of the substrate 108. In other words, a shape having a part of the display screen 102 of a normal display/input device 100 (touch panel) covered by a part of the substrate 108 corresponds to the structure of the cross section A.

(Cross Section B)

The structure of the cross section B has its feature in the size of the sensor 106. In case of the cross section A, the display panel 110 as well as the sensor 106 is extended to the area of the outer frame 104. However, no image, GUI or the like is displayed on the display panel 110 at the outer frame 104. Thus, the display panel 110 does not have to be provided to the area of the outer frame 104. The structure of the cross section B has only the sensor 106 extended to the area of the outer frame 104. Furthermore, since the display panel 110 is not included in the area of the outer frame 104, the upper surface of the sensor 106 does not have to be covered with a part of the substrate 108. Accordingly, the substrate 108 is not partially provided on the sensor 106. That is, a shape having the sensor 106 of a normal display/input device 100 (touch panel) extended to the outer frame 104 corresponds to the structure of the cross section B.

(Cross Section C)

The structure of the cross section C has its feature in the structures of sensors 106A and 106B. Although the sensors 106A and 106B are formed as separate bodies, they each have the same function as the sensor 106. As described above, the structures of the cross sections A and B each correspond to a shape having one or both of the sensor 106 and the display panel 110 extended to the outer frame 104. However, according to the structure of the cross section C, the sensor 106 is not extended to the outer frame 104, and the sensor 106A is provided to the area of the display screen 102 and the sensor 106B is provided to the area of the outer frame 104. Also, as with the above-described cross section B, the display panel 110 is not present at the outer frame 104 portion, and thus the upper surface of the sensor 106B is not covered by a part of the substrate 108.

By applying any of the structures of the cross section A, cross section B and cross section C described above, the sensor area can be expanded to the outer frame 104. Furthermore, by using the display/input device 100 configured in this manner, a highly operable user interface is realized as described above. Here, with reference to FIGS. 4 and 5, let us consider in detail a case of using the above-described capacitive sensor as the sensor 106 (hereinafter, including the sensors 106A and 106B).

(Electrode Structure of Capacitive Sensor and Expansion of Sensor Area)

As described above, to expand the sensor area to the outer frame 104, at least the location at which the sensor 106 is arranged has to be expanded to the outer frame 104. In case of extending the sensor 106 arranged in the display screen 102 to the outer frame 104 as in the cases of the cross sections A and B, if the sensor 106 is the capacitive sensor, an electrode pattern 112 of the sensor 106 will be as shown in FIG. 4.

Figure 4:
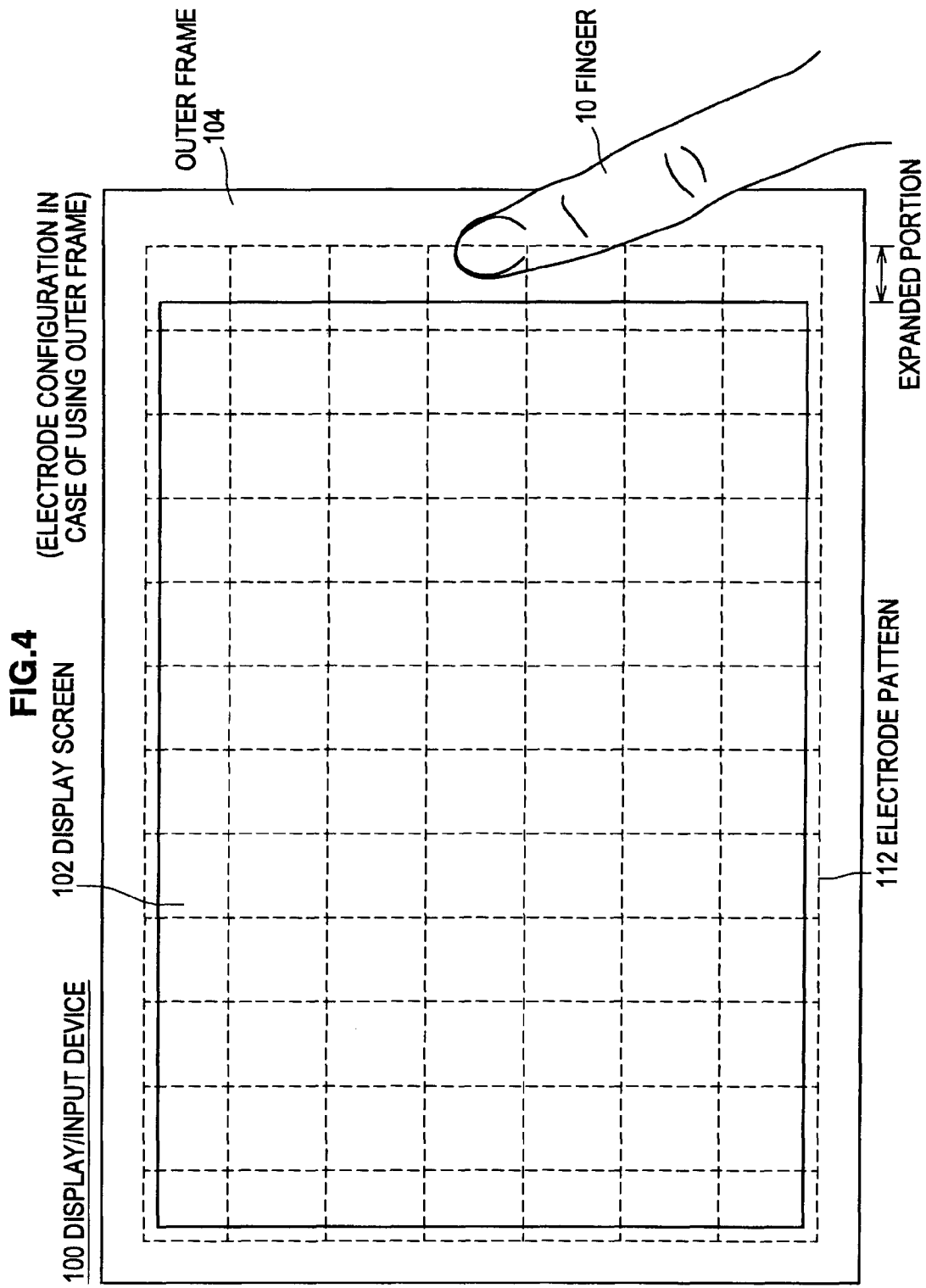
FIG. 4 is an explanatory diagram showing an example of an electrode pattern of the sensor provided to the display/input device in case of expanding the sensor area to the frame portion of the display panel.

Normally, when expanding the sensor area to the outer frame 104, the electrode pattern 112 forming the sensor 106 is arranged so as to include whole of the expanded sensor area as shown in FIG. 4. Thus, when the outer frame 104 is touched by the finger 10, a change in capacitance occurs at a part of the electrode pattern 112 stretching out to the outer frame 104, and the touch position is detected. However, due to the expansion of the electrode pattern 112 to the outer frame 104, the resolution of the sensor 106 is reduced compared to before the expansion. Referring to FIG. 5, a detailed explanation will be given on this point.

Figure 5:
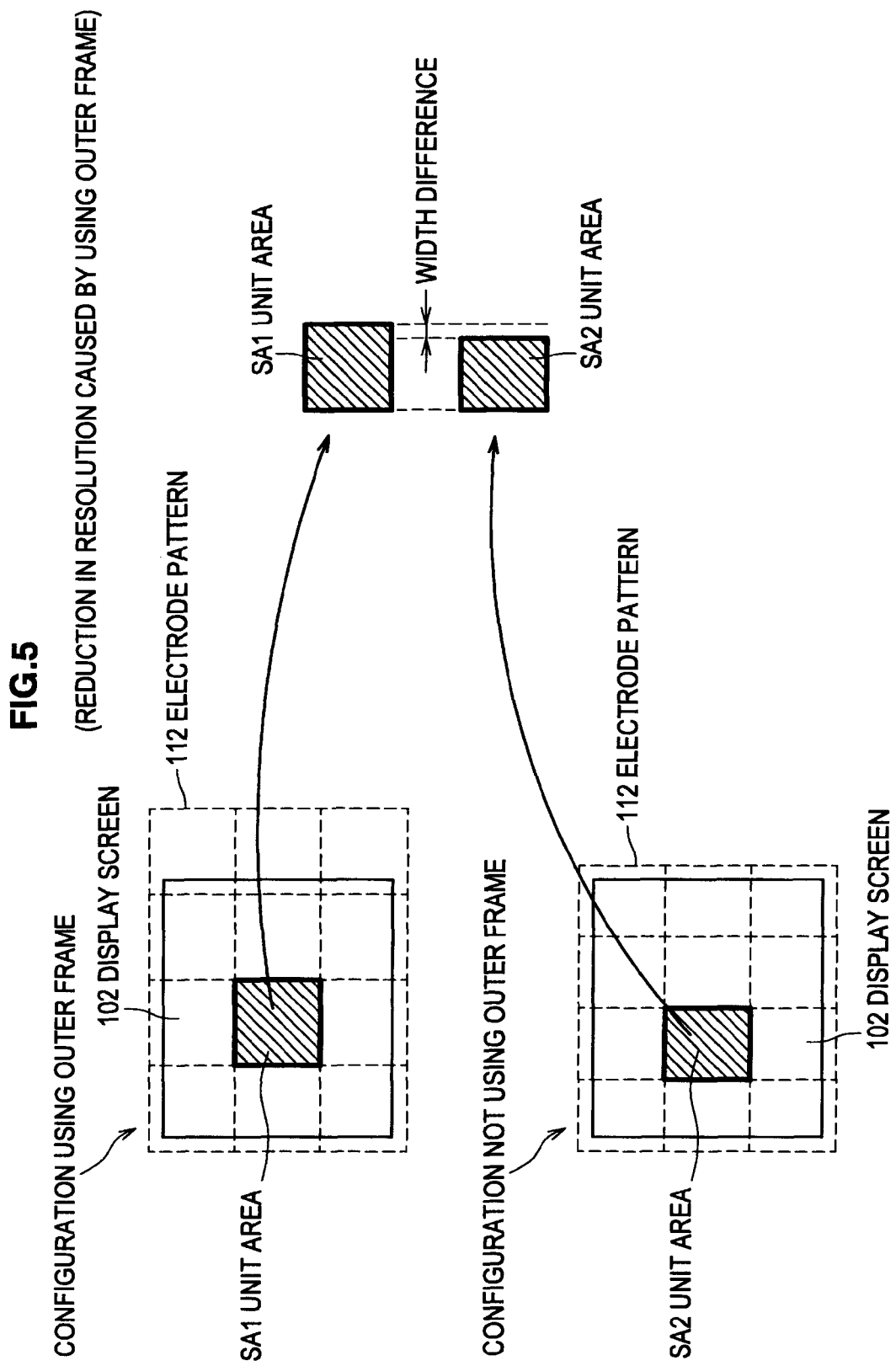
FIG. 5 is an explanatory diagram comparing a detection resolution of the sensor provided to the display/input device in case of expanding the sensor area to the frame portion of the display panel with a detection resolution in case of non-expansion.

The electrode pattern 112 expanded to the outer frame 104 and the electrode pattern 112 before expansion are schematically shown in FIG. 5. As already described, the capacitive sensor specifies the touch position by detecting the change in the capacitance of the capacitor equivalently formed between the column electrodes and the row electrodes. That is, the interval between the intersecting points of the column electrodes and the row electrodes corresponds to the resolution limit of the capacitive sensor. In other words, the resolution of the capacitive sensor is determined based on the size of a unit mesh surrounded by the row electrode and the column electrode.

Thus, the size of a unit area SA1 included in the electrode pattern 112 expanded to the outer frame 104 and the size of a unit area SA2 included in the electrode pattern 112 before expansion are compared. The size of the unit area SA1 is larger than the size of the unit area A2 by the amount of expansion. That is, it can be seen that, by expanding the electrode pattern 112 to the outer frame 104, the resolution of the sensor 106 is reduced. Such reduction in the resolution is not desirable. Furthermore, there is a call for the enjoyment of the merit of expanding the sensor area to the outer frame 104. Accordingly, it is desired to expand the sensor area without reducing the resolution of the sensor 106.

(Electrode Structure According to Proposed Method)

First, let us look again at the operating principle of the capacitive sensor. As already described, the capacitive sensor is a sensor section for detecting a change in the capacitance occurring between the row electrodes and the column electrodes arranged with a dielectric material in between. Furthermore, the change in the capacitance is caused at the time the finger 10 of the user, or the like, is brought into proximity of or made to contact the capacitive sensor, by the electric field formed by the row electrode or the column electrode being affected by the finger 10 which is a type of a conductor. Specifically, even if the electrode pattern 112 is not directly pressed by the user using the finger 10, a change in the capacitance is actually caused and the touch operation by the user can be detected. Thus, as shown in FIG. 6, in the present embodiment, a method for arranging the electrode pattern 112 without largely extending it out to the outer frame 104 is proposed.

Figure 6:
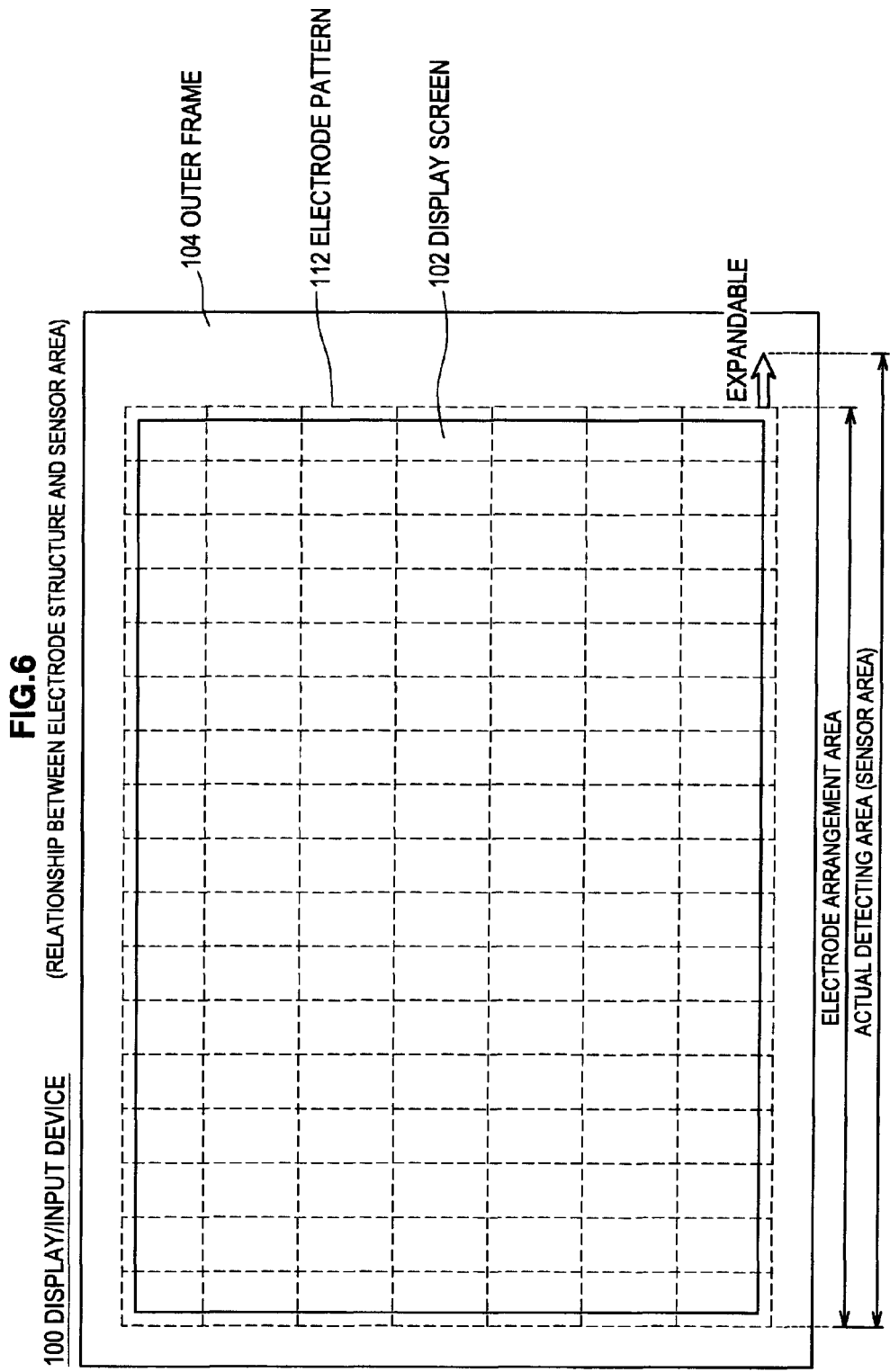
FIG. 6 is an explanatory diagram showing an example of an electrode pattern of a sensor provided to a display/input device according to an embodiment of the present invention.

As shown in FIG. 6, the display/input device 100 according to the present embodiment has the electrode pattern 112 arranged without the electrode pattern 112 being largely extending out from the display screen 102 to the outer frame 104. Particularly, the electrode pattern 112 is arranged so that, when the finger 10 of the user, or the like, is brought into proximity of or made to contact the outer frame 104, a change in the capacitance occurs at a part of the electrode pattern 112 nearest to the outer frame 104. With this configuration, an area on which the electrode pattern 112 is arranged (hereinafter, an electrode arrangement area) in the present embodiment becomes small compared to the electrode arrangement area shown in FIG. 4. That is, reduction in the resolution of the sensor 106 caused by the expansion of the sensor area can be prevented.

(1-3: Method for Clearly Indicating Sensor Area)

As described above, in the present embodiment, the sensor area is expanded to the outer frame 104 without largely extending the electrode pattern 112 out from the display screen 102 to the outer frame 104. Thus, the sensor area does not include the entire outer frame 104 but is limited to a part of the outer frame 104. Accordingly, the user has to perform an operation, being fully aware of the boundary of the sensor area in the outer frame 104. If an operation is performed unaware of the boundary of the sensor area, processing is often not executed even when an operation is performed. Thus, in the present embodiment, a method for clearly indicating the boundary of the sensor area to the user and allowing the user to perform an operation without being anxious is proposed.

(1-3-1: Method for Clearly Indicating Boundary of Sensor Area by Silkscreen)

Figure 7:
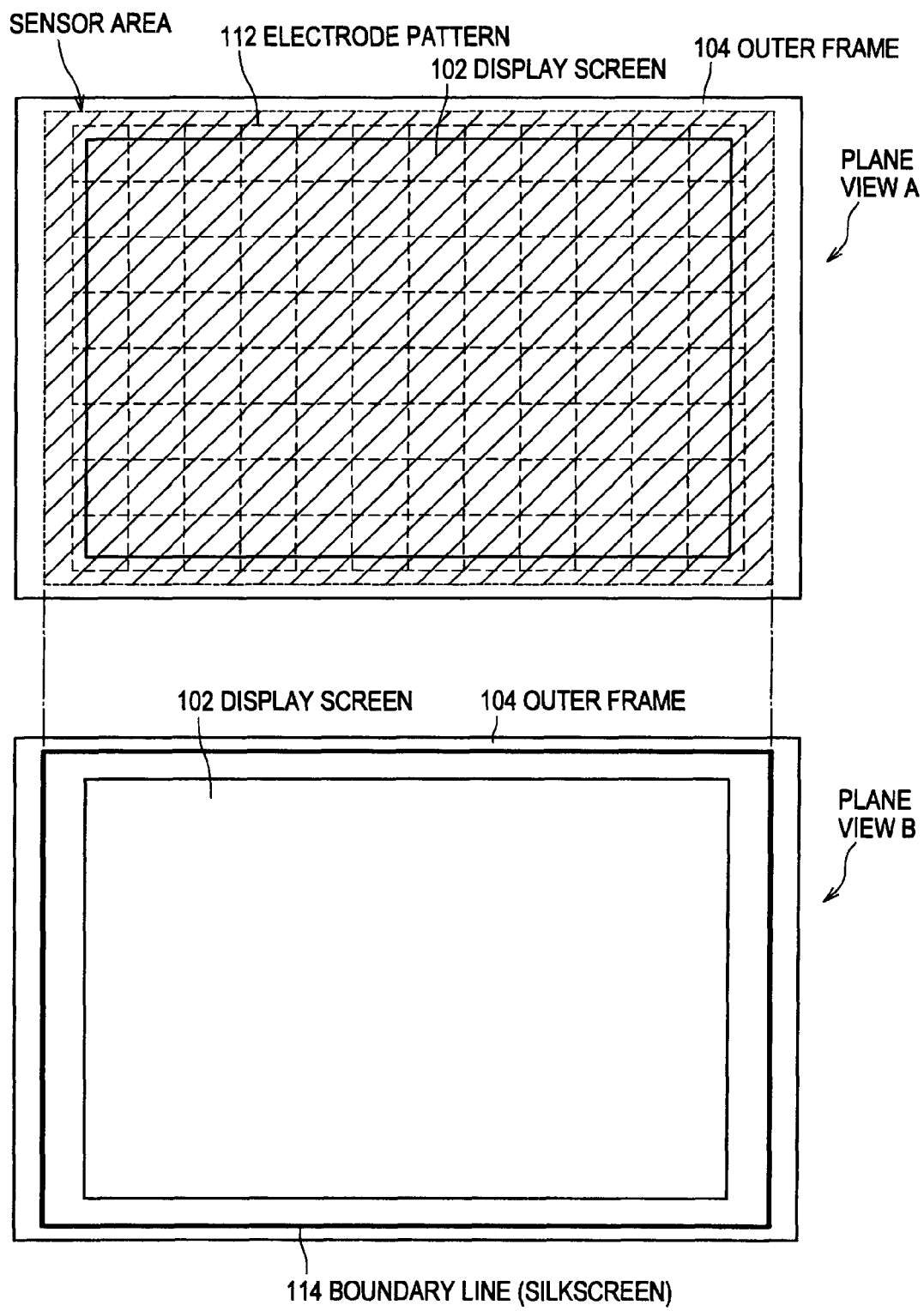
FIG. 7 is an explanatory diagram showing an example of a method of the display/input device according to the present embodiment for visually indicating a boundary of a sensor area capable of detecting a user input.

First, referring to FIG. 7, an explanation is given on a method for clearly indicating the boundary of the sensor area by silkscreen. FIG. 7 relates to a method for clearly indicating the sensor area according to the present embodiment, and is an explanatory diagram showing an example of a method for clearly indicating the boundary of the sensor area by silkscreen.

As shown in FIG. 7, the electrode pattern 112 approximately the same size as the display screen 102 is provided, and the sensor area is expanded to a part of the outer frame 104. As can be seen from the example shown in FIG. 7, the sensor area does not include the entire outer frame 104. That is, even if the finger 10 of the user is brought into proximity of or made to contact an edge portion of the outer frame 104 far from the display screen 102, a change in the capacitance enough to be detected by the sensor 106 is not induced at the electrode pattern 112. Therefore, even if the user touched an edge portion of the outer frame 104 by the finger 10, the touch position is not detected by the sensor 106.

Thus, the inventors of the present application have proposed, as an example of a method for clearly indicating the sensor area, a method for displaying a boundary line 114 by silkscreen as shown in FIG. 7. This method is an example of a method for visually clearly indicating the sensor area. By displaying the boundary line 114 in this manner, the user can easily understand that he/she is to operate the inside of the boundary line 114 (area on the side of the display screen 102). Thus, the user can surely operate the inside of the sensor area even when operating the outer frame 104. As a result, cases of processing not being executed because the operation is performed on the outside the sensor area can be reduced, and the operability can be significantly improved.

(1-3-2: Method for Clearly Indicating Boundary of Sensor Area by Changing Material)

Figure 8:
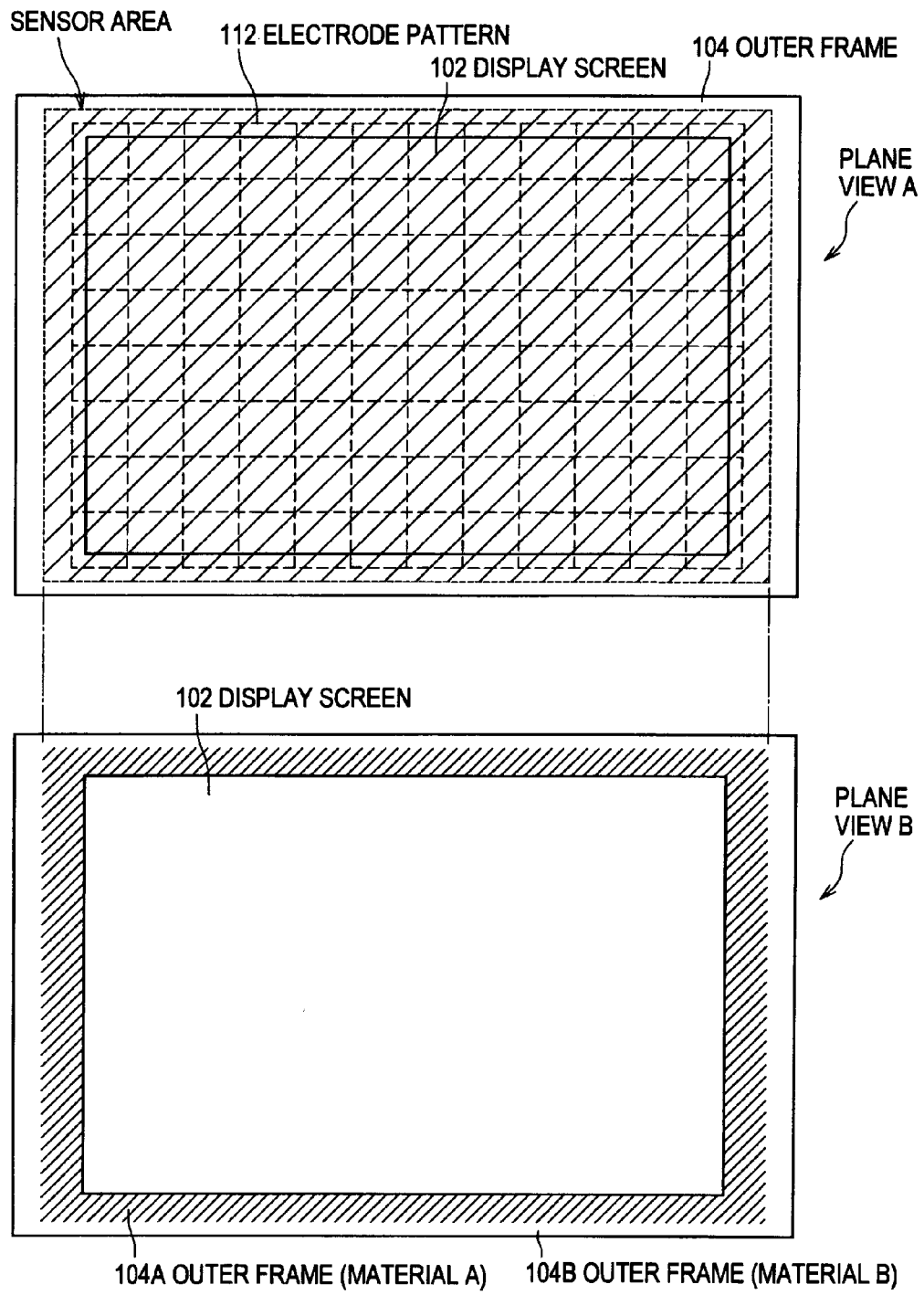
FIG. 8 is an explanatory diagram showing an example of a method of the display/input device according to the present embodiment for haptically indicating a boundary of a sensor area capable of detecting a user input.

Next, referring to FIG. 8, an explanation is given on a method for clearly indicating the boundary of the sensor area by changing a material. FIG. 8 relates to a method for clearly indicating the sensor area according to the present embodiment, and is an explanatory diagram showing an example of a method for clearly indicating the boundary of the sensor area by changing the material.

A method illustrated in FIG. 8 is an example of a method for haptically indicating the sensor area. Heretofore, the material of the outer frame 104 has not been specified. However, in the example of FIG. 8, an outer frame 104A included in the sensor area is formed from a material A, and an outer frame 104B not included in the sensor area is formed from a material B. Here, the material A and the material B are materials different from each other, and the feel of the material A and the feel of the material B are different from each other. With this configuration, the user can haptically notice the difference in the feels of the materials A and B, and can surely recognize the boundary of the sensor area.

As described above, by clearly indicating the boundary, the user can easily understand that he/she is to operate the inside of the boundary (outer frame 104A). Thus, the user can surely operate the inside of the sensor area even when operating the outer frame 104. As a result, cases of processing not being executed because the operation is performed on the outside of the sensor area can be reduced, and the operability can be significantly improved.

(1-3-3: Method for Clearly Indicating Boundary of Sensor Area by Providing Step)

Next, referring to FIG. 9, an explanation is given on a method for clearly indicating the boundary of the sensor area by providing a step. FIG. 9 relates to a method for clearly indicating the sensor area according to the present embodiment, and is an explanatory diagram showing an example of a method for clearly indicating the boundary of the sensor area by providing a step.

A method illustrated in FIG. 9 is an example of a method for haptically indicating the sensor area. Heretofore, a shape of the outer frame 104 has not been specified. However, in the example of FIG. 9, a step is provided to the outer frame 104 so that the sensor area is a step lower than a non-sensor area. As described with reference to FIG. 3, several types of structures exist for the sensor 106, the display panel 110 and the substrate 108 for expanding the sensor area to the outer frame 104. Thus, in FIG. 9, cross-sectional diagrams each corresponding to an example of FIG. 3 are shown. However, each cross-sectional diagram of FIG. 9 is of a structure according to which the outer frame 104 is provided with a step for clearly indicating the sensor area.

(Cross Section A)

The structure of the cross section A has its feature in the sizes of the sensor 106 and the display panel 110. In case of the cross section A, a multilayer structure is formed, similarly to the display screen 102, in the order of the substrate 108, the display panel 110, the sensor 106 and the substrate 108 from the bottom layer. That is, in case of the cross section A, the layers of the sensor 106 and display panel 110 provided to the area of the display screen 102 are simply extended to the outer frame 104. Also, the area of the outer frame 104 not used for displaying an image, a GUI or the like is covered by a part of the substrate 108. In other words, a shape having a part of the display screen 102 of a normal display/input device 100 (touch panel) covered by a part of the substrate 108 corresponds to the structure of the cross section A. However, in case of the structure shown in FIG. 9, the non-sensor area of the outer frame 104 is set to be a level higher, and a step is provided at the boundary portion between the sensor area and the non-sensor area.

(Cross Section B)

The structure of the cross section B has its feature in the size of the sensor 106. In case of the cross section A, the display panel 110 as well as the sensor 106 is extended to the area of the outer frame 104. However, no image, GUI or the like is displayed on the display panel 110 at the outer frame 104. Thus, the display panel 110 does not have to be provided to the area of the outer frame 104. The structure of the cross section B has only the sensor 106 extended to the area of the outer frame 104. Furthermore, since the display panel 110 is not included in the area of the outer frame 104, the upper surface of the sensor 106 does not have to be covered with a part of the substrate 108. Accordingly, the substrate 108 is not partially provided on the sensor 106. That is, a shape having the sensor 106 of a normal display/input device 100 (touch panel) extended to the outer frame 104 corresponds to the structure of the cross section B. However, in case of the structure shown in FIG. 9, the non-sensor area of the outer frame 104 is set to be a level higher, and a step is provided at the boundary portion between the sensor area and the non-sensor area.

(Cross Section C)

The structure of the cross section C has its feature in the structures of sensors 106A and 106B. Although the sensors 106A and 106B are formed as separate bodies, they each have the same function as the sensor 106. As described above, the structures of the cross sections A and B each correspond to a shape having one or both of the sensor 106 and the display panel 110 extended to the outer frame 104. However, according to the structure of the cross section C, the sensor 106 is not extended to the outer frame 104, and the sensor 106A is provided to the area of the display screen 102 and the sensor 106B is provided to the area of the outer frame 104. Also, as with the above-described cross section B, the display panel 110 is not present at the outer frame 104 portion, and thus the upper surface of the sensor 106B is not covered by a part of the substrate 108. Moreover, in case of the structure shown in FIG. 9, the non-sensor area of the outer frame 104 is set to be a level higher, and a step is provided at the boundary portion between the sensor area and the non-sensor area.

By applying any of the structures of the cross section A, cross section B and cross section C described above, a structure of the display/input device 100 with the sensor area expanded to the outer frame 104 and the boundary of the sensor area made easy to grasp is realized. That is, the user can haptically notice the boundary between the sensor area and the non-sensor area and can surely perceive the range of the sensor area. Thus, by using the display/input device 100 configured in this manner, a highly operable user interface is realized.

Heretofore, methods for clearly indicating the boundary of the sensor area according to the present embodiment have been described. As described, by visually or haptic ally indicating boundary of the sensor area to the user, the user is allowed to perceive as if a detection section for a touch position is present up to the boundary even if the detection section for a touch position is not wired throughout the whole outer frame 104.

2: Conclusion

Lastly, the functional configuration of the display/input device of the present embodiment, and the effects obtained by the functional configuration will be briefly described.

First, the functional configuration of the display/input device according to the present embodiment can be expressed as follows. The display/input device includes a position sensor and an outer frame portion as described below. The position sensor has an electrode pattern in grid form arranged thereon, and is for specifying a position of an operating tool by detecting a capacitance changing at a contact part or a proximity part at a time the operating tool is made to contact the electrode pattern or is brought into proximity of the electrode pattern. In this manner, when a capacitive sensor is used that specifies the position of an operating tool by detecting a change in capacitance occurring at the electrode pattern at a time the operating tool is brought into contact or into proximity, the position of operating tool can be detected even if the operating tool is not made to contact the electrode pattern or is brought into proximity of the inside of the electrode pattern.

For example, in case the position sensor is provided that is equal in size to the display screen, a pressure detection sensor, for example, will have to have the operating tool such as a finger or a touch pen press the inside of the display screen. However, according to the operating principle of the capacitive sensor, a magnetic field induced in the proximity of the electrode pattern changes by the operating tool being made to contact the electrode pattern or being brought into proximity thereof, and a change in the capacitance occurring according to the change is detected. Thus, when a capacitive position sensor is used, even if the position sensor is provided that is equal in size to the display screen, the position of the operating tool made to contact the outside of the display screen (outer frame portion) or brought into proximity thereof can be detected.

Now, the above-described outer frame portion forms the outer frame of the display screen provided with the position sensor. A boundary of an area where the position of the operating tool can be specified by the position sensor despite a non-presence of the electrode pattern is visually or haptically indicated at the outer frame portion. As described above, the position sensor according to the present embodiment can detect the position of the operating tool that is made to contact an area without the electrode pattern or is brought into proximity thereof. Thus, the position of the operating tool that is made to contact the outer frame portion or is brought into proximity thereof can also be detected by the position sensor. However, the outer frame portion includes an area (sensor area) where the position of the operating tool can be detected by the position sensor when the operating tool is brought into contact or into proximity and an area (non-sensor area) where the detection is not possible.

However, it is very difficult for a user to perceive the boundary between the sensor area and the non-sensor area. Thus, the user may operate the non-sensor area thinking that he/she is operating the sensor area and may erroneously think that the location sensor is malfunctioning, or he/she may find operation using the outer frame portion stressful. Accordingly, as described above, in the present embodiment, the boundary is clearly indicated at the outer frame portion so that the boundary between the sensor area and the non-sensor area is visually or haptically perceived. In this manner, by clearly indicating the boundary, the user will be less likely to erroneously operate the non-sensor area in spite of intending to operate the sensor area. As a result, the operability is improved.

Now, as a method for expanding the sensor area to the outer frame portion, there is a method for expanding the location sensor to the outer frame portion. That is, a method is conceived to arrange the electrode pattern almost entirely across the outer frame portion, making the entire outer frame portion the sensor area. Using this method, it becomes unnecessary to clearly indicate at the outer frame portion the boundary between the sensor area and the non-sensor area. However, with this method, the size of each unit mesh forming the electrode pattern increases compared to a case where the electrode pattern is arranged in the display screen. That is, when the number of the column electrodes/row electrodes are the same, the resolution of the location sensor is reduced.

To avoid such reduction in the resolution, it is desired to expand the sensor area without unnecessarily enlarging the size of the position sensor. The configuration of the above-described present embodiment serves to provide solving means to such a request.

Moreover, as a method for clearly indicating at the outer frame portion the boundary between the sensor area and the non-sensor area, a configuration is conceived for changing the materials of the sensor area and the non-sensor area, for example. That is, among areas included in the outer frame portion, the area where the position of the operating tool can be specified by the position sensor and an area where the position of the operating tool cannot be specified by the position sensor may be formed from materials with respectively different feels. With this configuration, a user can haptically discriminate between the sensor area and the non-sensor area.

Furthermore, as the method for clearly indicating at the outer frame portion the boundary between the sensor area and the non-sensor area, a configuration is conceived for changing the thicknesses of the sensor area and the non-sensor area, for example. That is, a step may be provided at a boundary portion between the area where the position of the operating tool can be specified by the position sensor and an area where the position of the operating tool cannot be specified by the position sensor, among areas included in the outer frame portion. With this configuration, a user can haptically discriminate between the sensor area and the non-sensor area.

Furthermore, as the method for clearly indicating at the outer frame portion the boundary between the sensor area and the non-sensor area, a configuration is conceived for silk-screening a boundary line between the sensor area and the non-sensor area. That is, a boundary line may be displayed at a boundary portion between the area where the position of the operating tool can be specified by the position sensor and an area where the position of the operating tool cannot be specified by the position sensor, among areas included in the outer frame portion. With this configuration, a user can visually discriminate between the sensor area and the non-sensor area.

Furthermore, as the method for clearly indicating at the outer frame portion the boundary between the sensor area and the non-sensor area, a configuration is conceived for changing the colours of the sensor area and the non-sensor area. That is, among areas included in the outer frame portion, the area where the position of the operating tool can be specified by the position sensor and an area where the position of the operating tool cannot be specified by the position sensor may have respectively different colours. With this configuration, a user can visually discriminate between the sensor area and the non-sensor area.

It should be understood by those skilled in the art that various modifications, combinations, sub-combinations and alterations may occur depending on design requirements and other factors insofar as they are within the scope of the appended claims or the equivalents thereof.

In the above description of the embodiment, although an explanation has been made with the capacitive sensor as an example, the technology of the present embodiment can be applied to any sensor as long as the sensor is capable of detecting the touch position on the outer side of the electrode pattern, for example.

The present application contains subject matter related to that disclosed in Japanese Priority Patent Application JP 2009-17191 filed in the Japan Patent Office on Jan. 28, 2009, the entire content of which is hereby incorporated by reference.

What is claimed is:

1. A display/input device comprising:
a position sensor on which an electrode pattern in grid form is arranged, the position sensor being configured for specifying a position of an operating tool by detecting a capacitance change at a location touched by the operating tool or at a location proximate to the operating tool when the operating tool is made to contact the electrode pattern or is brought into proximity of the electrode pattern; and
an outer frame portion forming an outer frame of a display screen provided with the position sensor,
wherein the electrode pattern extends from the display screen of the outer frame portion and the area occupied by the electrode pattern is less than a first area where the position of the operating tool can be specified by the position sensor, and
wherein a boundary of the first area is visually or haptically indicated at the outer frame portion.

2. The display/input device according to claim 1, wherein, among areas included in the outer frame portion, the first area and a second area where the position of the operating tool cannot be specified by the position sensor are formed from materials with respectively different feels.

3. The display/input device according to claim 1, wherein a step is provided at a boundary portion between the first area and a second area where the position of the operating tool cannot be specified by the position sensor, among areas included in the outer frame portion.

4. The display/input device according to claim 1, wherein a boundary line is displayed at a boundary portion between the first area and a second area where the position of the operating tool cannot be specified by the position sensor, among areas included in the outer frame portion.

5. The display/input device according to claim 1, wherein, among areas included in the outer frame portion, the first area and a second area where the position of the operating tool cannot be specified by the position sensor have respectively different colors.

6. The display/input device according to claim 1, wherein the portion of the outer frame portion over which the electrode pattern extends includes only an area in the outer frame that immediately contacts and surrounds the display screen.

7. A display device comprising:
a display screen;
an outer frame surrounding the display screen;
an electrode pattern for specifying a touch location of an operating tool by detecting a change in capacitance at the touch location, wherein the electrode pattern is arranged over the display screen and extends from the display screen to a portion of the outer frame; and
a sensor area on which the touch location is actually detectable by the electrode pattern, the sensor area being greater than an area covered by the electrode pattern, wherein the outer frame is configured to indicate a boundary of the sensor area.

8. The display device of claim 7, wherein the outer frame comprises a silkscreen for displaying the boundary of the sensor area.

9. The display device of claim 7, wherein the outer frame comprises a first material in an area covered by the sensor area and a second material in an area not covered by the sensor area, wherein the first and second materials are different from each other.

10. The display device of claim 7, wherein the outer frame comprises a step defining the boundary of the sensor area.

11. The display/input device according to claim 7, wherein the outer frame comprises a first area occupied by the sensor area for sensing the touch location and a second area where the touch location cannot be detected, and wherein the first area comprises a material haptically different from that of the second area.

12. The display/input device according to claim 7, wherein the outer frame comprises a first area occupied by the sensor area for sensing the touch location and a second area where the touch location cannot be detected, and wherein a step is provided along a boundary line between the first area and the second area.

13. The display/input device according to claim 7, wherein the outer frame comprises a first area occupied by the sensor area for sensing the touch location and a second area where the touch location cannot be detected, and wherein a boundary line between the first area and the second area is displayed on the outer frame.

14. The display/input device according to claim 7, wherein the outer frame comprises a first area occupied by the sensor area for sensing the touch location and a second area where the touch location cannot be detected, and wherein the first area comprises a first color and the second area comprises a second color different from the first color.

* * * * *